(No Model.)
E. NIFENECKER.
ATTACHMENT FOR COOKING STOVES.
No. 356,260. Patented Jan. 18, 1887.
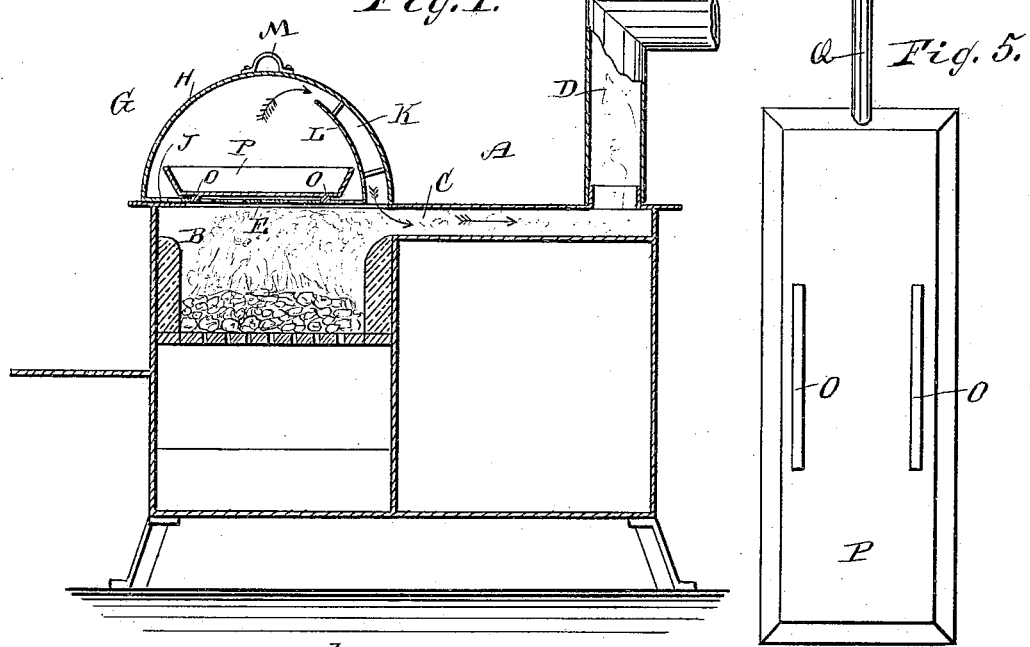
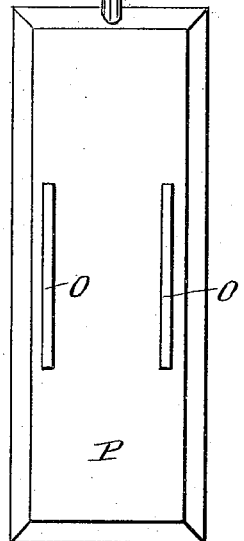
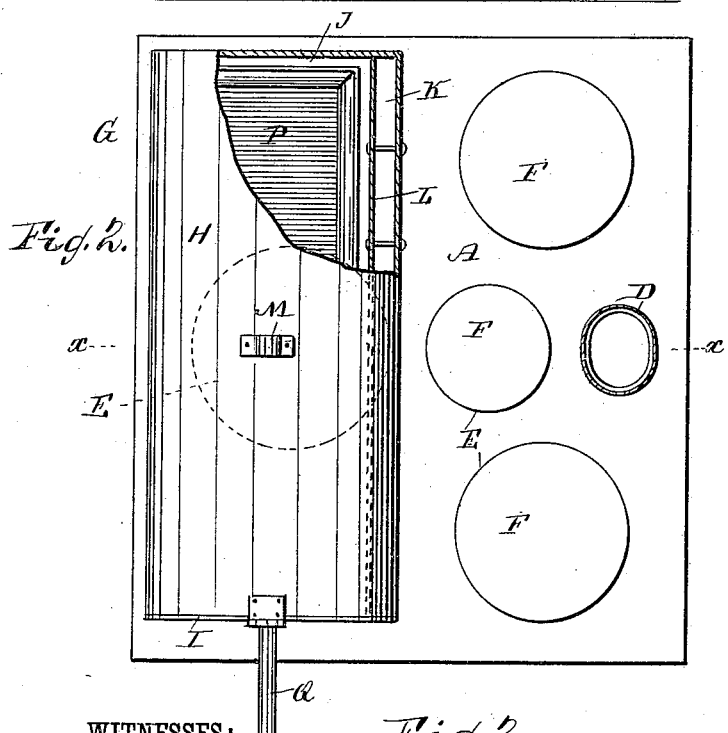
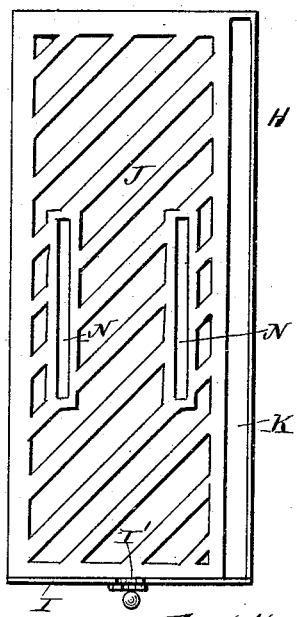
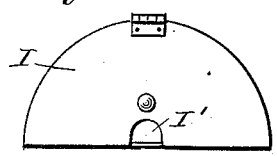
WITNESSES:
INVENTOR.
E. Nifenecker
BY
ATTORNEYS.

UNITED STATES PATENT OFFICE.

EUGENE NIFENECKER, OF WEST NEW BRIGHTON, NEW YORK, ASSIGNOR TO HIMSELF AND HENRY A. LOVE, OF SAME PLACE.

ATTACHMENT FOR COOKING-STOVES.

SPECIFICATION forming part of Letters Patent No. 356,260, dated January 18, 1887.

Application filed April 14, 1886. Serial No. 198,811. (No model.)

*To all whom it may concern:*

Be it known that I, EUGENE NIFENECKER, of West New Brighton, in the county of Richmond and State of New York, have invented a new and Improved Attachment for Cooking-Stoves, of which the following is a full, clear, and exact description.

The object of my invention is to provide a new and improved attachment to be used in connection with cooking-stoves, for the purpose of carrying off all vapors, odors, and smoke arising in boiling, broiling, and frying.

The invention consists of a hood or cover having a hinged door and an inner flue, of a grate-bottom attached to the cover, and of a frying-pan held in place on the grate-bottom in the cover, and which is removable from the grate-bar.

The invention also consists of various parts and details, and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a sectional elevation, on the lines *x x* of Fig. 2, of a cooking-stove provided with my attachment. Fig. 2 is a plan view of the same with parts broken out. Fig. 3 is an end view of the attachment. Fig. 4 is a bottom view of the same; and Fig. 5 is a bottom view of the frying-pan.

The cooking-stove A, or a range of any approved construction, is provided with the ordinary fire-box B, which connects with the flue C, leading to the chimney D, and with the usual apertures, E, which, when no cooking utensil is placed over them, are generally kept closed by the lids or covers F.

The attachment G consists of the hood or cover H, closed at one end, and provided on the other end with a hinged door, I, having an aperture, I', in the center near the bottom, and of a bottom or grate, J, secured to the hood or cover H in any suitable manner.

A flue, K, is formed on the inside of the cover or hood H by the partition L, extending from end to end on one side of the hood and to near the top of the same and fastened in any suitable manner. A handle, M, is secured to the top of the hood or cover H, by which the attachment G can be lifted to or from the stove or range.

The bottom grate, J, is provided with two apertures, N N, in which fit the lugs O, attached to the under side of the bottom of the frying-pan P, made in any desired form and size, and provided with the handle Q.

In using this attachment G one or more of the covers F are removed from the stove, and the attachment G is then placed on the latter, so as to cover the open apertures E on the top plate of the stove or range, as shown in Figs. 1 and 2. The end door, I, of the hood or cover H is then swung upward, and the frying-pan P, containing the articles to be cooked, fried, or boiled or broiled, placed inside of the hood H, resting on the bottom grate, J, and held in place on the same by the lugs O, fitting into the apertures N on the bottom grate, J. The door I is then swung downward and the hood H is closed, the aperture I' in the door I fitting over the handle Q of the frying-pan P.

It will be seen that all the vapor, odors, or smoke arising from the articles in the frying-pan under treatment over the fire from the fire-place B will rise and flow into the flue K, and down the same into the open apertures E in the stove-top plate, and from there are drawn by the draft of the chimney D into the flue C and to the chimney D, so that no smell, vapor, or smoke is perceptible in the apartment in which the stove or range is situated.

The process of the cooking, frying, boiling, or broiling of the articles in the frying-pan P can at any time be observed by swinging the door I upward, whereby a free view of the pan P and its contents is had.

The bottom grate, J, may be constructed without the apertures N, and a frying-pan of ordinary form can be used, if desired.

Having thus fully described my invention, what I claim as new, and desire to secure by Letters Patent, is—

1. A stove attachment consisting of a hood or cover closed at one end and having a flue formed on the inside of the same, of a grate-bottom, and of a hinged end door, substantially as shown and described.

2. In a stove attachment, the combination, with a hood or cover closed at one end, of a grate-bottom, a hinged end door, and a partition forming a flue on the inside of the hood or cover, substantially as shown and described.

EUGENE NIFENECKER.

Witnesses:
H. A. LOVE,
THEO. G. HOSTER.